(12) United States Patent
Low et al.

(10) Patent No.: US 9,992,354 B2
(45) Date of Patent: Jun. 5, 2018

(54) MEDIA REFLECTANCE IDENTIFIERS

(75) Inventors: Tong Nam Samuel Low, Singapore (SG); Chin Hung Andy Koh, Singapore (SG)

(73) Assignee: Hewlett-Packard Development Company, L.P., Houston, TX (US)

( * ) Notice: Subject to any disclaimer, the term of this patent is extended or adjusted under 35 U.S.C. 154(b) by 1131 days.

(21) Appl. No.: 13/363,227

(22) Filed: Jan. 31, 2012

(65) Prior Publication Data

US 2013/0194622 A1 Aug. 1, 2013

(51) Int. Cl.
*G06F 3/12* (2006.01)
*H04N 1/00* (2006.01)
*H04N 1/407* (2006.01)
*H04N 1/60* (2006.01)
*H04N 1/23* (2006.01)

(52) U.S. Cl.
CPC ....... *H04N 1/00015* (2013.01); *H04N 1/0005* (2013.01); *H04N 1/00031* (2013.01); *H04N 1/00087* (2013.01); *H04N 1/2323* (2013.01); *H04N 1/407* (2013.01); *H04N 1/4076* (2013.01); *H04N 1/6097* (2013.01); *H04N 2201/0082* (2013.01)

(58) Field of Classification Search
CPC combination set(s) only.
See application file for complete search history.

(56) References Cited

U.S. PATENT DOCUMENTS

| 6,291,829 | B1* | 9/2001 | Allen et al. ............... 250/559.07 |
| 7,015,474 | B2 | 3/2006 | Martenson |
| 7,156,482 | B2* | 1/2007 | Boleda et al. ................. 347/19 |
| 7,429,744 | B2 | 9/2008 | Cheong et al. |
| 7,548,328 | B2 | 6/2009 | Hult et al. |
| 7,800,089 | B2 | 9/2010 | Burke et al. |
| 7,864,383 | B2* | 1/2011 | Shiraishi ...................... 358/474 |
| 7,995,188 | B2 | 8/2011 | Ferran et al. |
| 2004/0008244 | A1* | 1/2004 | Tsujimoto ..................... 347/105 |
| 2007/0019216 | A1* | 1/2007 | Chodagiri et al. ............. 358/1.9 |
| 2010/0290090 | A1* | 11/2010 | Ono et al. .................... 358/3.27 |
| 2011/0096117 | A1 | 4/2011 | Burke et al. |

FOREIGN PATENT DOCUMENTS

JP           2004009668 A       1/2004

* cited by examiner

*Primary Examiner* — Idowu O Osifade

(74) *Attorney, Agent, or Firm* — HP Inc. Patent Department

(57) ABSTRACT

In one embodiment, a stated reflectance identifier for a media to be printed on during fulfillment of a print job is received. Utilizing an optical sensor and an illuminator, a measurement is taken of light from the illuminator reflected off the media. The measurement is compared to a stored average brightness value. Responsive to determining the measurement is within a range of the average value, the average value is adjusted to include the measurement, and printing on the media is caused according to the job. Responsive to determining the measurement is outside the range, the measurement is compared to a database associating brightness measurements and reflectance identifiers to determine an estimated reflectance identifier for the media. The estimated identifier is sent to a user and the user is prompted to perform a correction event. The media is printed on according to the job.

20 Claims, 8 Drawing Sheets

Media Identifier Database (302 / 304) — 108

| Previously Detected Illuminator Brightness Values | Expected Reflectance Type of Media |
|---|---|
| 10 | Plain paper |
| 3 | Glossy paper |
| 6 | Semi-glossy paper |
| 9 | Matte paper |
| 13 | Dark colored paper |
| 17 | Very dark colored paper |

FIG. 3A

Media Identifier Database (302 / 306 / 304) — 108

| Previously Detected Illuminator Brightness Values | How far is the Brightness Measurement away from the Average Brightness Value? | Expected Reflectance Type of Media |
|---|---|---|
| 10 | 10-10 = 0 | Plain paper |
| 3 | 10-3 = 7 | Glossy paper |
| 6 | 10-6 = 4 | Semi-glossy paper |
| 9 | 10-9 = 1 | Matte paper |
| 13 | 10-13 = -3 | Dark colored paper |
| 17 | 10-17 = -7 | Very dark colored paper |

FIG. 3B

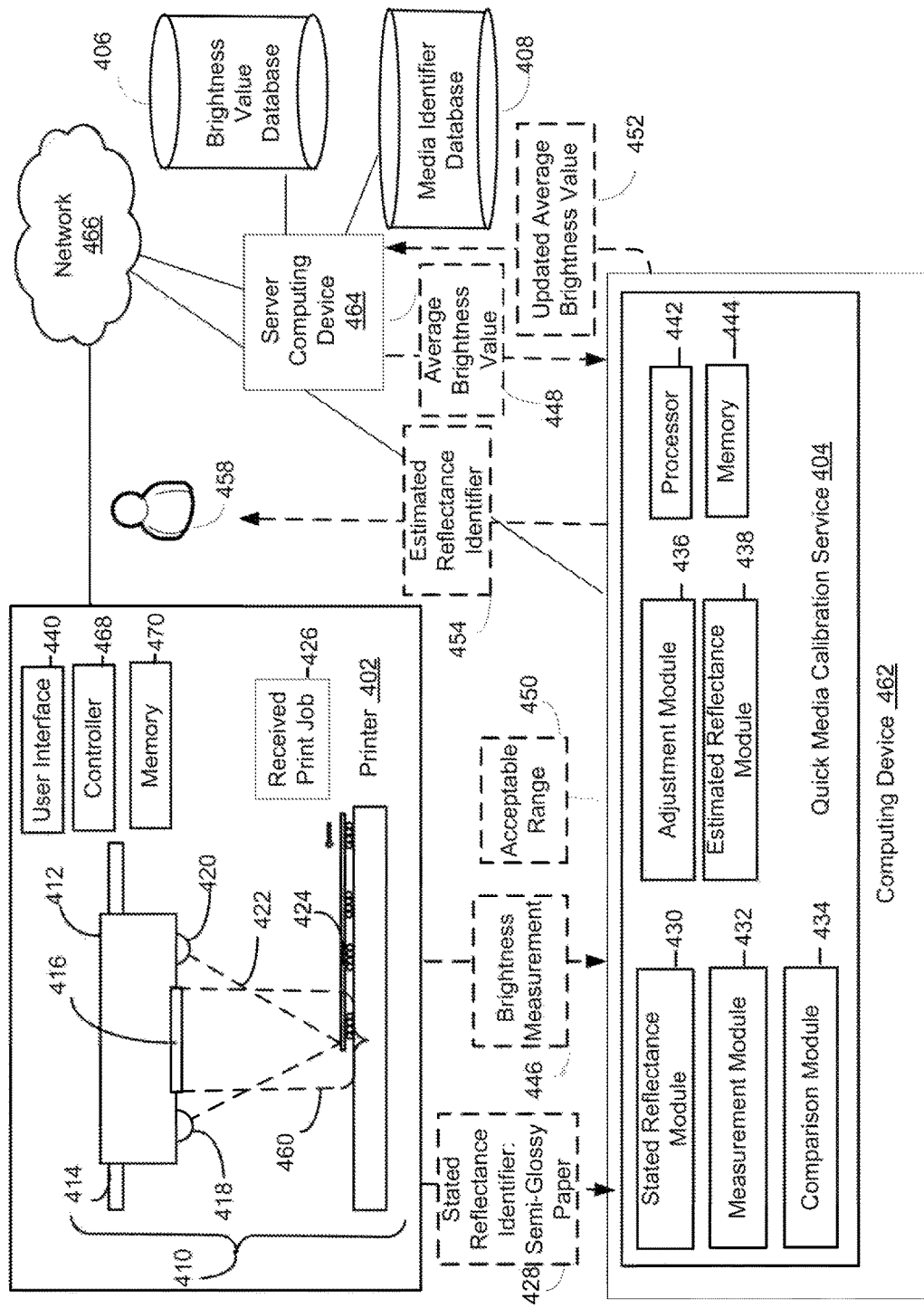

MEDIA REFLECTANCE IDENTIFIERS

BACKGROUND

Today's users of printing devices expect to be able to print on a wide variety of medias, including ordinary plain white, glossy, semi-glossy, matte-finish, and dark colored paper medias. Some users may desire to print on non-paper medias such as plastics, vinyls, or fabrics. Each of these types of media may absorb or receive marking agents differently, such that when a media of a certain reflectance type is being printed upon it may advantageous for the printer to adjust a print mode or switch between print modes in accordance with the media reflectance type to maximize print quality. For example, when printing on a plain paper media, information regarding media reflectance type may be used to select a particular print mode that will provide an optimal amount of marking agent in an optimal number of printing passes, and/or select a particular media-handling mode that provides optimal pickup and/or transport of the media. In examples, a printer may receive information that identifies or states the media reflectance type to be used as part of a received print job, or as input via a printer user interface media is loaded into the printer.

BRIEF DESCRIPTION OF THE DRAWINGS

The accompanying drawings illustrate various embodiments and are a part of the specification. The illustrated embodiments are examples and do not limit the scope of the claims. Throughout the drawings, identical reference numbers designate similar, but not necessarily identical elements.

FIGS. 3A and 3B are examples of media identifier databases, according to various embodiments.

FIG. 4 is a block diagram illustrating a system according to various embodiments.

The same part numbers designate the same or similar parts throughout the figures.

DETAILED DESCRIPTION OF EMBODIMENTS

Figure 1:
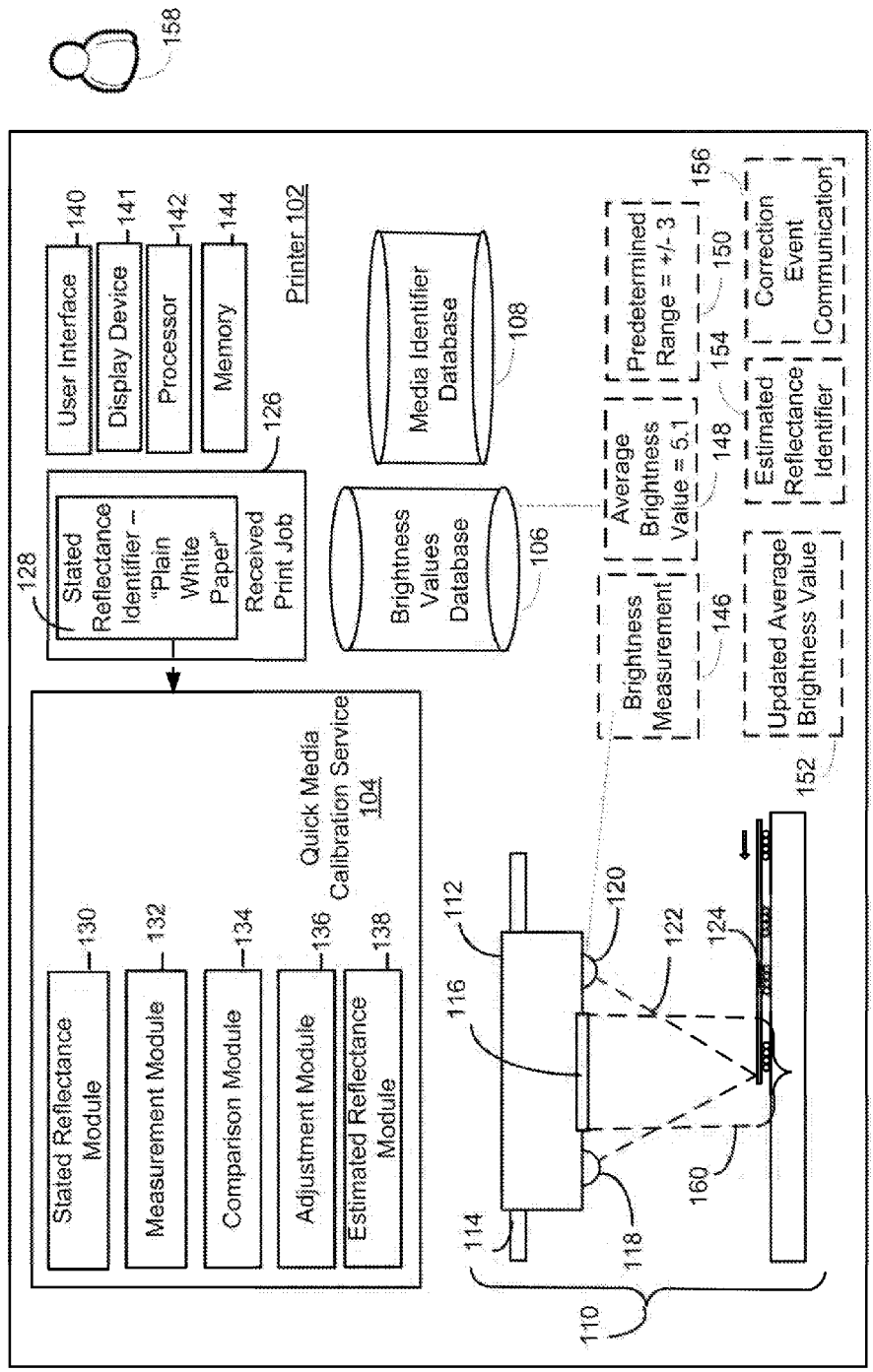
FIG. 1 is a block diagram illustrating a system according to various embodiments.

Some printers can confirm a media reflectance type by utilizing a light source and an optical sensor to gather information regarding the reflectance value of the media's printing side. Such gathered reflectance information can then be compared to a list of manufacturer-provided reflectance values, or to media reflectance information that was previously gathered utilizing traditional techniques in calibrating the sensor and the light source, to identify the media.

However, in certain situations utilization of a light source and optical sensor to take reflectance readings of medias can produce erroneous identification of media and result in suboptimal print quality. As a printer is used over a time period, aerosol or other contaminants from printing operations can coat the sensor or the light source such that a derived reflectance value will be erroneous. While a periodic running of an illuminator-adjustment calibration that adjusts the intensity of the light source used in media-type detection can help with the aerosol coating issues, such a traditional calibration method can be time consuming and slow print processing. Further, such traditional calibrations are typically performed during non-printing periods such as at startup or shutdown, or when printhead and/or ink cartridges are being replaced, or when a printhead alignment calibration is manually triggered. Thus, for printers that are used to produce long print runs with infrequent power-downs and infrequent printhead or cartridge changes that might afford time for a traditional full calibration, misidentification of media and lowered print quality are more likely.

Print quality issues that can arise due to the erroneous reflectance readings and misidentification of the media reflectance type include, but are not limited to inconsistent printhead shifts during printing of a plot due to poor edge detection, use of a suboptimal print mode, and/or use of a suboptimal media pickup, media transport, or other media-handling mode.

Accordingly, various embodiments described herein were developed to provide a system, a method, and a computer-readable storage medium containing instructions, to enable a quick media calibration service (sometimes referred to herein as a "QMC service") for a light source and sensor that measures light from the source as reflected off a media. The QMC service can be operated during printing operations, e.g., prior to the printing of each page of a print job, to watch for an aberrant or outlier reflectance media readings and thereby flag possible misidentification of media by the sensor. According to various embodiments, a QMC service receives a stated reflectance identifier for a media to be printed on during fulfillment of a print job. In an example, the stated reflectance identifier may be received as part of a print job that is received at the QMC service, or as user input (e.g., input via a printer user interface when media is loaded into a printer). The QMC service utilizes an optical sensor and a light source to take a measurement of brightness of light from the illuminator reflected off the media. The QMC service then utilizes the measurement to confirm or recognize an inaccuracy in the stated reflectance identifier by comparing the measurement to a stored average brightness value for medias identified with the stated reflectance identifier, or identified with a same reflectance value as the stated reflective identifier.

If the QMC service determines that measurement is within a predetermined range of the average value, the service adjusts the average value to include the measurement and proceeds with printing operations. However, If the QMC service determines that the measurement is outside the predetermined range, the service compares the measurement to a database associating brightness measurements and reflectance identifiers to determine an estimated reflectance identifier for the media. The QMC service sends the estimated identifier to a user and prompts the user to perform a correction event that will reconcile disparity between the stated reflectance identifier and the estimated identifier, and then causes the printing to take place upon the media.

In certain embodiments, the QMC service performs the comparison responsive to determining that it is not time to perform a regularly scheduled or periodic calibration routine that includes readjusting brightness of the light. In certain embodiments, if the QMC determines that it is time to perform a regularly scheduled or periodic illuminator-adjustment calibration routine, the service clears the average stored average brightness value and proceeds with the illuminator-adjustment calibration prior to fulfilling the print job.

Advantages of the disclosure include that regular, quick calibrations can be performed during running of a print job without lengthy pauses or slow processing speeds. The disclosed quick calibration can account for shrinkage of an output signal from the sensor as aerosol or other contamination impedes the sensor's ability to measure light reflected from a media. The disclosed quick calibration is easy to use, and uses less computer resources than does a traditional calibration. These increases in printing efficiency and print quality will lead to increased user satisfaction with printing and printers that include or perform embodiments of the disclosure. Another advantage of the disclosure is that a single channel optical sensor can be used to distinguish between medias of a multitude media reflectance types, in lieu of a more expensive multi-channel sensor.

As used in this application, a "printer" or "printing device" refers to any liquid inkjet printer, toner-based printer, sold ink printer, or any other electronic device that prints." "Printer" or "printing device" includes any multi-functional electronic device that performs a function such as scanning and/or copying in addition to printing. "Marking agent" refers to any substance applied to a media during a printing operation, including but not limited to aqueous inks, solvent inks, UV-curable inks, dye sublimation inks, latex inks, powders and toners. "Marking component" refers to a mechanism or apparatus within a printer that applies a marking agent to a media during a printing operation. "Print job" refers to instructions and/or content for printing that can be stored in a programming language and/or numerical form so that it can stored and used in computing devices, servers, printers and other machines capable of performing calculations and manipulating data. A print job may include one or more plots. "Plot" is used synonymously with an "image", and refers to a representation or rendering of an object, scene, person, or an abstraction such text or a geometric shape. "Print mode" refers to a method, way, or manner of operation as printing of a print job is accomplished. Examples of print modes include, but are not limited to draft, duplex, photo, color, grayscale, and black ink only printing. "Media" and "print media" are used synonymously and may include a sheet, a continuous roll or web, or any other article or object on which a printed image can be formed. "Database" refers to any organized collection of data in digital form such that it can be stored in computer memory or a data storage device. "Reflectance type" and "reflectance identifier" are used synonymously, and characterize print media according to the media's reflectance of light. Examples of reflectance types/reflectance identifiers for medias include, but are not limited to, "ordinary plain white", "glossy", "semi-glossy", "extra glossy", "matte-finish", and "colored", and "dark colored" medias. In some embodiments, a reflectance type/reflectance identifier may be expressed numerically rather than in the text descriptions as in the preceding sentence. "Stated reflectance identifier" refers to a stated reflectance identifier of the reflectance of a media. "Illuminator" refers to any light source, and is used herein synonymously with "light source" and "illumination source". "Brightness value" refers to a measurement of a brightness of a light source as measured by an optical sensor. An "average brightness value" is calculated by averaging a plurality of brightness value measurements. "Range" refers to the extent to which variation is permitted. "Correction event" refers to an action taken by a user to rectify a disparity between a stated reflectance identifier and an estimated reflectance identifier. "Illuminator-adjustment calibration" refers to a calibration to adjust brightness of an illuminator. "Printable position" refers to a media position with a printer in which the media is adjacent to a marking component to apply ink, an electrically charged drum to apply toner, or any other marking agent. "Draft mode" refers to a print mode implemented as a result of a user direction that a print job be printed in a manner that emphasizes speed or economy over print quality.

FIG. 1 is a block diagram illustrating a system according to various embodiments. FIG. 1 includes particular components, modules, etc. according to various embodiments. However, in different embodiments, more, fewer, and/or other components, modules, arrangements of components/modules, etc. may be used according to the teachings described herein. In addition, various components, modules, etc. described herein may be implemented as one or more software modules, hardware modules, special purpose hardware (e.g., application specific hardware, application specific integrated circuits (ASICs), embedded controllers, hardwired circuitry, etc.), or some combination of these.

FIG. 1 shows a printer 102, representing generally any computing device or group of computing devices configured to operable to produce printed print jobs or other content. In embodiments, printer 102 may be additionally operable to send and receive network requests, send and receive print jobs, and otherwise communicate with other computer systems via a link and/or over a network. Printer 102 is shown to include a quick media calibration service 104, brightness value database 106, and a media identifier database 108. Printer 102 includes printing and calibration components 110, including a printhead carriage 112 that holds a printhead 116, an illumination source 118, and an optical sensor 120. The printhead carriage 112 is movably connected to guide bar 114. Optical sensor 120 is configured to receive light 122 from illumination source that is reflected off a media 124. Illumination source 118 and optical sensor 120 may be used together during a printing operation to perform edge detection and media positioning measurements that promote accurate movement of media through a print path and, through printable positions, and accurate printing of plots.

In this example, printer 102 additionally includes a user interface 140, display device 141, processor 142, and memory 144. In embodiments user interface 140 may be a touchpad, keypad, keyboard or any other device that enables or facilitates interaction between user 159 and printer 102. In embodiments, display device 141 may be a touchscreen, LCD screen, monitor, or any other display apparatus. Processor 142, representing generally any instruction execution system, such as a computer/processor based system or an ASIC (Application Specific Integrated Circuit), a computer, or other system that can fetch or obtain instructions or logic stored in memory 144 and execute the instructions or logic contained therein. In some embodiments of a printer, processor 142 may be referred to as a controller. Memory 144 represents generally any memory configured to store program instructions and other data. In a given implementation, processor 142 may represent multiple processors, and memory 144 may represent multiple memories.

Quick media calibration service 104 represents generally any combination of hardware and programming configured to perform a quick calibration for a light source and sensor that measures light from the source as reflected off a media. The quick calibration can be performed in a fraction of the time it takes to perform a traditional light-adjusting calibration, and therefore can be conducted during printing operations, e.g., prior to the printing of each page of a print job, without noticeable delays in printing. Quick media calibration service 104 includes stated reflection module 130, measurement module 132, comparison module 134, adjustment module 136, and estimated reflectance module 138.

In the example of FIG. 1, printer 102 receives a print job 126, e.g., via an internet connection at the printer, or from a host or another computing device connected to printer 102 via a network. Print job 126 includes a stated reflectance identifier 128 of "plain white paper" that describes reflectance type of media 124 that print job 126 is to be printed upon during fulfillment of print job 126. The stated reflectance identifier 128 is passed to, and received by, stated reflectance module 130.

Measurement module 132, utilizing optical sensor 120 and illumination source 118, takes a measurement 146 of the brightness of the light emitted from illumination source 118 as reflected off media 124. In one embodiment, media 124 is situated in a printable position 160 during the taking of the measurement 146. Comparison module 134 then compares the brightness measurement 146 to a stored average brightness value 148 for other medias that have been identified with a same reflectance type ("plain white paper") as the stated reflectance identifier 128. In this example, the average brightness value is stored at brightness value database 106.

Figure 2:
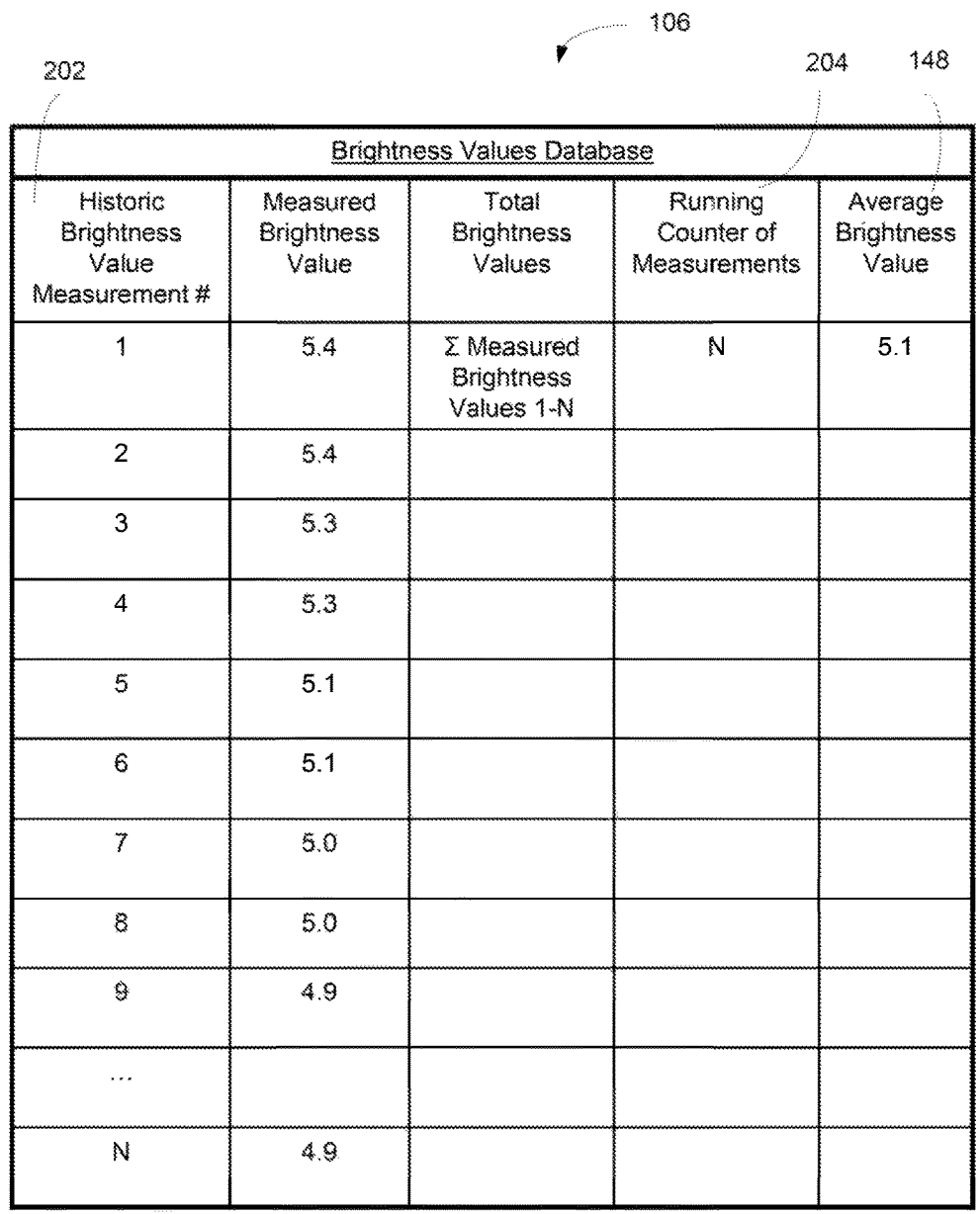
FIG. 2 is an example of a brightness values database, according to various embodiments.

FIG. 2, in view of FIG. 1, provides an example of a brightness values database 106. In this example, the database 106 includes N "historic brightness value" measurements 202 of light from illuminator 118 as measured by sensor 120, the light having been reflected off other medias that had a same reflectance type as the stated reflectance identifier 128 over a period of time since a full illuminator-adjustment calibration was last performed. In one embodiment, the other medias were situated in a same printable position 160 position during taking of the plurality of brightness measurements as media 124 is positioned in during the taking of brightness measurement 146. Brightness values database 106 also includes a running counter 204 of the number of measurements to be averaged (in this example, N). In this example, an average brightness value 148 of "5.1" is calculated according to the formula Σ Measured Brightness Values 1–N/N.

Returning to FIG. 1, next adjustment module 136 determines whether measurement 146 is within a predetermined range of the stored average brightness value 148. In this example, the predetermined range 150 is "+/−3". If it is determined that measurement 146 is within the "+/−3" range 150 of the "5.1" average brightness value 148, adjustment module 136 adjusts the average brightness value 148 to create an updated average brightness value 152 that includes the just-taken brightness measurement 146. Following the adjustment of the average value 148 to create the updated average brightness value 152, adjustment module 136 causes printing on media 124 in accordance with print job 126 and its stated reflectance identifier 128 for media 124.

On the other hand, if it is determined that measurement 146 is outside the "+/−3" range 150 , estimated reflectance value module 136 then compares brightness measurement 146 to a media identifier database 108 that associates brightness measurements and reflectance identifiers to determine an estimated reflectance identifier 154 for media 124.

FIG. 3A, in view of FIG. 1, provides an example of a media identifier database 108. This particular media identifier database holds previously detected illuminator brightness values 302 for six different media reflectance types 304 (plain white paper="10", glossy paper="3", semi-glossy paper="6", matte paper="9", dark colored paper="13", and very dark colored paper="17"). In this example, if we assume the brightness measurement 146 equals "3", then estimated reflectance module 138, utilizing media identifier database 108, will determinate an estimated reflectance identifier of "glossy paper" for media 124. FIG. 3B, in view of FIG. 1, provides another example of a media identifier database 108. This particular media identifier database includes an additional column of data that lists calculations of differences between previously detected illuminator brightness values for a variety of media types 306 and the average brightness value 148 (in the example of FIG. 3B, the average brightness value is "10") The media identifier database 108 associates expected reflectance types 304 for medias with the differences 306.

Returning to FIG. 1, After determining the estimated reflectance identifier 154, estimated reflectance module 138 sends the estimated identifier 154 to a user 156 and prompts user 156 to perform a correction event that will reconcile the disparity between stated reflectance identifier 128 and estimated identifier 154. In an example, the estimated identifier 154 and the prompting may be sent to user 156 via a touchscreen user interface 140 or display device 141 located at printer 102. In an example, a user correction event may include confirming that media loaded in the printer is of a same reflectance type as the expected reflectance identifier. In another example, a user correction event may include replacing media loaded in a printer or printable position with new media. In yet another example, a user correction event may include changing a stated reflectance identifier (e.g., via restatement at a user interface at a printer, or via modification of a print job) to correspond with the estimated reflectance identifier. Following the user's performance of the correction event, estimated reflectance module 138 causes printing on the media according to print job 126.

The functions and operations described with respect to quick media calibration service 104 and printer 102 may be implemented as a computer-readable storage medium containing instructions executed by a processor (e.g., processor 142) and stored in a memory (e.g., memory 144).

FIG. 4 is a block diagram illustrating a system according to various embodiments. FIG. 4 includes particular components, modules, etc. according to various embodiments. However, in different embodiments, more, fewer, and/or other components, modules, arrangements of components/modules, etc. may be used according to the teachings described herein. In addition, various components, modules, etc.. described herein may be implemented as one or more software modules, hardware modules, special purpose hardware (e.g., application specific hardware, application specific integrated circuits (ASICs), embedded controllers, hardwired circuitry, etc.), or some combination of these.

FIG. 4 shows a computing device 462 electronically connected to a server computing device 464 and a printer 402 via a network 466. Computing device 462 represents generally any computing device or group of computing devices configured to send and receive network requests and content, and otherwise communicate with server computing device 464 and printer 402. In embodiments, computing device 462 may be or include a server, desktop computer, notebook computer, mobile device, tablet computer, and/or any other computing device.

Server computing device 464 represents generally any computing device or group of computing devices configured to send and receive network requests and content, and otherwise communicate with computing device 462 and printer 402. Server computing device 464 is connected to brightness value database 406 and media identifier database 408, and is operable to communicate data regarding brightness values and media reflectance identifiers to computing device 462.

Printer 402 represents generally a computing device that is operable to produce printed print jobs or other content, and additionally operable to send and receive network requests and content, and otherwise communicate with, computing device 462 over network 466. Printer 402 includes printing and calibration components 410, including a printhead carriage 412 that holds a printhead 416, a light-emitting diode ("LED") 418, and a single-channel optical sensor 420. The printhead carriage 412 is movably connected to guide bar 414. Optical sensor 420 is configured to receive light 422 from LED 418 that is reflected off a media 424. LED 418 and optical sensor 420 may be used together during a printing operation to perform edge detection and media positioning measurements that promote accurate movement of media through a print path and through printable positions, and accurate printing of plots. Printer 402 additionally includes a user interface 440, controller 468 to control printer operations, and memory 470.

Network 466 represents generally hardware components and computers interconnected by communications channels that allow sharing of resources and information. Network 466 may include a cable, wireless, fiber optic, or remote connection via a telecommunication link, an infrared link, a radio frequency link, or some combination of these, or any other connectors or systems that provide electronic communication. Network 466 may include, at least in part, an intranet, the internet, or a combination of both. Network 466 may also include intermediate proxies, routers, switches, load balancers, and the like. The paths followed by network 466 between computing device 462, server computing device 464, and printer 402 as depicted in FIG. 4 represent the logical communication paths between these devices, not necessarily the physical paths between the devices.

Computing device 462 is shown to include quick media calibration service 404, processor 442, and memory 444. Quick media calibration service 308 represents generally any combination of hardware and programming configured to perform a quick calibration for a light source and sensor that measures light from the source as reflected off a media. Quick media calibration service 404 includes stated reflection module 430, measurement module 432, comparison module 434, adjustment module 436, and estimated reflectance module 438.

In the example of FIG. 4, printer 402 receives a print job 426, e.g., via an internet connection at the printer or from a host or another computing device connected to printer 402 via a network. Printer 402 also receives from user 458, a stated reflectance identifier 428 of "semi-glossy paper" that describes reflectance type of the media that user 458 loaded into the printer 402 to be used in fulfillment of print job 426. Printer 402 sends stated reflectance identifier 428 to computing device, and stated identifier 428 is received by stated reflectance module 430.

Measurement module 432, after determining that print job is not a draft mode print job, utilizes optical sensor 420 and LED 418, to take a measurement 446 of the brightness of the light emitted from LED 418 as reflected off media 424.

Comparison module 434 makes a determination as to whether it is time for printer 402 to perform a periodic or regularly scheduled illuminator-adjustment calibration for the LED 418's brightness. If it is determined it is time to perform a light adjustment calibration for LED 418, comparison module 434 clears the average stored average brightness value 448 and the underlying historic brightness value measurements 202 (FIG. 2), and proceeds with the illuminator-adjustment calibration. Fulfillment of print job 426 continues after completion of the illuminator-adjustment calibration.

If comparison module 434 determines that is not time to perform a periodic or regularly scheduled illuminator-adjustment calibration for the LED 418, the quick calibration procedure continues. Comparison module 434 compares the brightness measurement 446 to a stored average brightness value 448 for other medias that have been identified with a same reflectance type ("semi-glossy paper") as the stated reflectance identifier 428. In this example, the average brightness value is stored at brightness value database 406.

Adjustment module 436 determines whether measurement 446 is within a predetermined acceptable range 450 of the stored average brightness value 448. If it is determined that measurement 446 is within the predetermined range 450 of the average brightness value 448, adjustment module 436 adjusts the average brightness value 448 to create an updated average brightness value 452 that includes and thereby takes into account the just-taken brightness measurement 446. Following the adjustment of the average value 448 to create the updated average brightness value 452, adjustment module 436 causes printing on media 424 in accordance with print job 426 and the stated reflectance identifier 428.

On the other hand, if it is determined that measurement 446 is outside the predetermined range 450 of the average brightness value 448, estimated reflectance value module 438 then communicates with server computing device 464 to compare brightness measurement 446 to media identifier database 408. Media identifier database 408 associates brightness measurements and reflectance identifiers to determine an estimated reflectance identifier 454 for media 424. After determining an estimated reflectance identifier 454 for the media (e.g., that the media 424 is actually "glossy paper" media), estimated reflectance module 438 sends the estimated identifier 454 to a user 456 and prompts user 456 to perform a correction event that will reconcile the disparity between stated reflectance identifier 428 and estimated identifier 454. Following the user's performance of the correction event, estimated reflectance module 438 causes printing on the media according to print job 426.

In examples, the correction event that the user is asked to perform may be to confirm whether the media is of a same reflectance type as the expected identifier. In a particular example estimated reflectance module 438, responsive to user 458's confirmation that media 424 is of a same reflectance type as the user intended for the print job, causes application of a particular print mode to printing of print job 426. In another example estimated reflectance module 438, responsive to user 458 communicating that the media loaded in the printer is not a same type as the user intended for the print job, applies a new print mode (e.g., different than a print mode in place at the beginning of printing of the print job) based on the reflectance type that the user attributes to the media.

The functions and operations described with respect to quick media calibration service 402 and computing device 404 may be implemented as a computer-readable storage medium containing instructions executed by a processor (e.g., processor 442) and stored in a memory (e.g., memory 444). In a given implementation, processor 442 may represent multiple processors, and memory 444 may represent multiple memories. Processor 442 represents generally any instruction execution system, such as a computer/processor based system or an ASIC (Application Specific Integrated Circuit), a computer, or other system that can fetch or obtain instructions or logic stored in memory 444 and execute the instructions or logic contained therein. Memory 444 represents generally any memory configured to store program instructions and other data.

Figure 5:
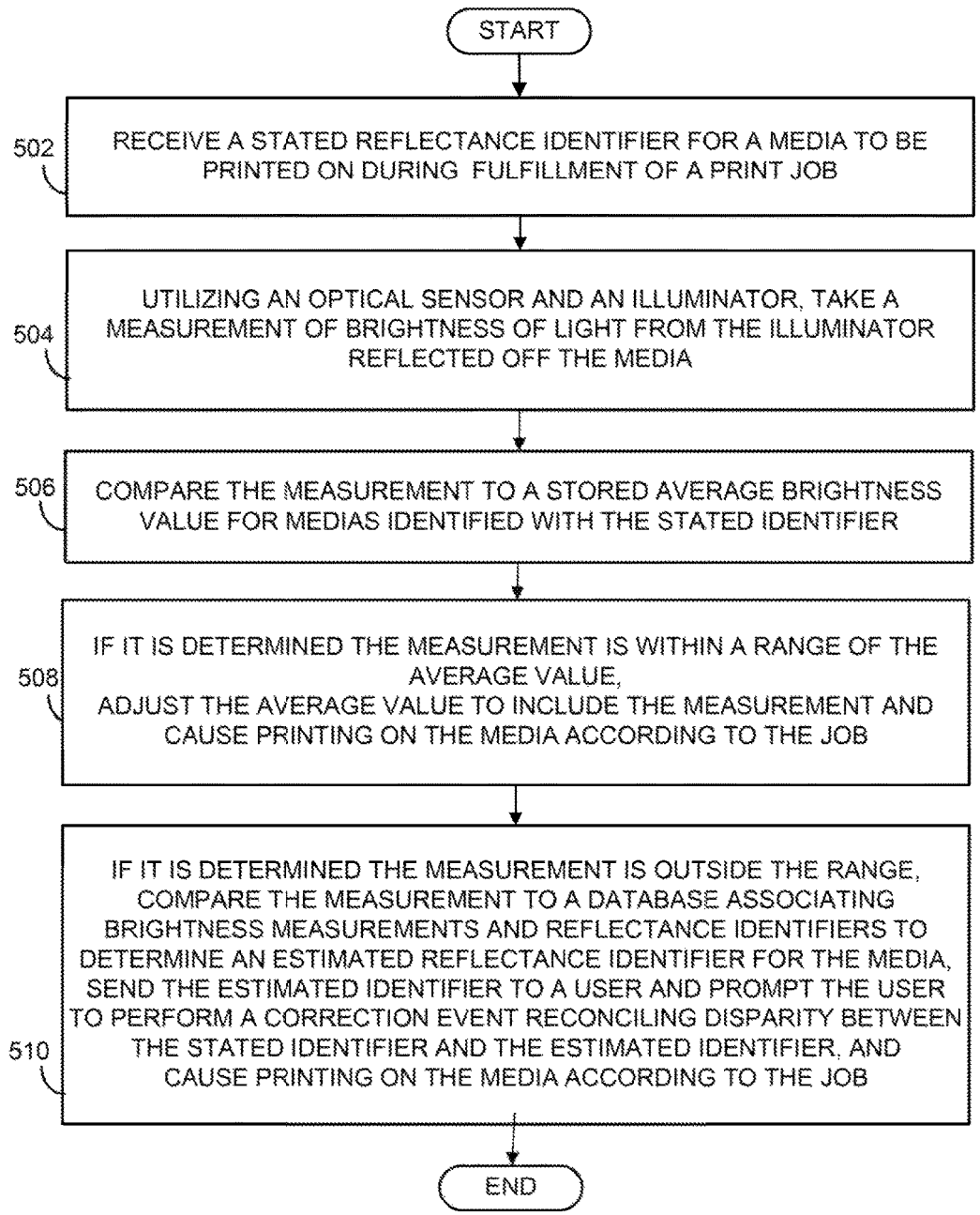
FIG. 5 is a flow diagram depicting steps taken to implement various embodiments.

FIG. 5 is a flow diagram of operation in a system according to various embodiments. In discussing FIG. 5, reference may be made to the diagrams of FIGS. 1 and 4 to provide contextual examples. Implementation, however, is not limited to those examples. Starting with FIG. 5, a stated reflectance identifier for a media to be printed on during fulfillment of a print job is received (block 502). Referring back to FIGS. 1 and 4, stated reflectance module 130 or 430 may be responsible for implementing block 502.

Continuing with FIG. 5, utilizing an optical sensor and an illuminator, a measurement of brightness is taken. The measurement is a measurement of light from the illuminator reflected off the media (block 504). Referring back to FIGS. 1 and 4, measurement module 132 or 432 may be responsible for implementing block 504.

Continuing with FIG. 5, the measurement is compared to a stored average brightness value for medias identified with the stated reflectance identifier (block 506). Referring back to FIGS. 1 and 4, comparison module 134 or 434 may be responsible for implementing block 506.

Continuing with FIG. 5, if it is determined that the measurement is within a range of the average value, the average value is adjusted to include the measurement and printing on the media proceeds (block 508). Referring back to FIGS. 1 and 4, adjustment module 136 or 436 may be responsible for implementing block 508.

Continuing with FIG. 5, if it is determined that the measurement is outside the range, the measurement is compared to a database associating brightness measurements and reflectance identifiers to determine an estimated reflectance identifier for the media. The estimated identifier is sent to a user and the user is prompted to perform a correction event reconciling disparity between the stated reflectance identifier and the estimated identifier. Printing proceeds after the user performs the correction event (block 510). Referring back to FIGS. 1 and 4, estimated reflectance module 138 or 438 may be responsible for implementing block 510.

Figure 6:
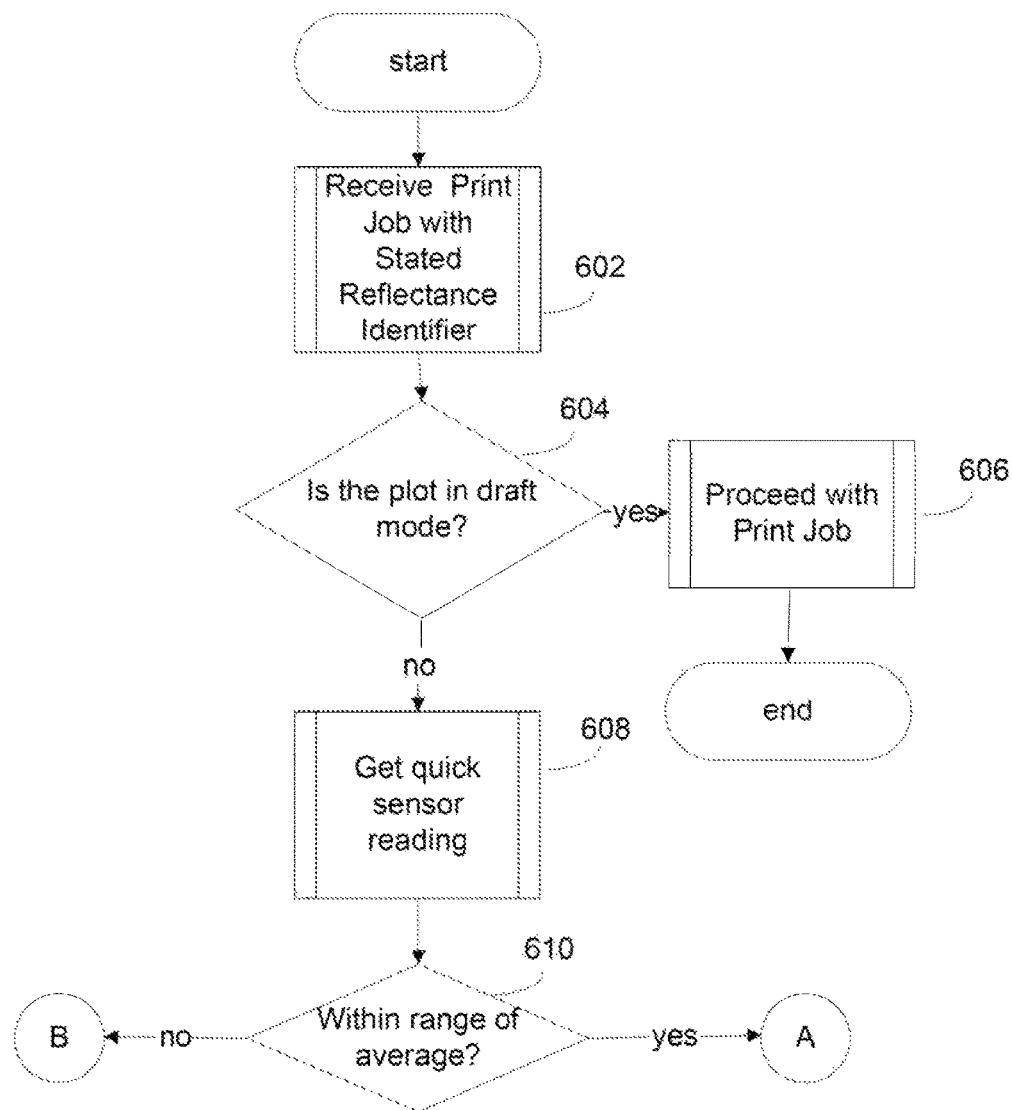
FIGS. 6-8 present a flow diagram of operation in a system according to various embodiments.
Figure 7:
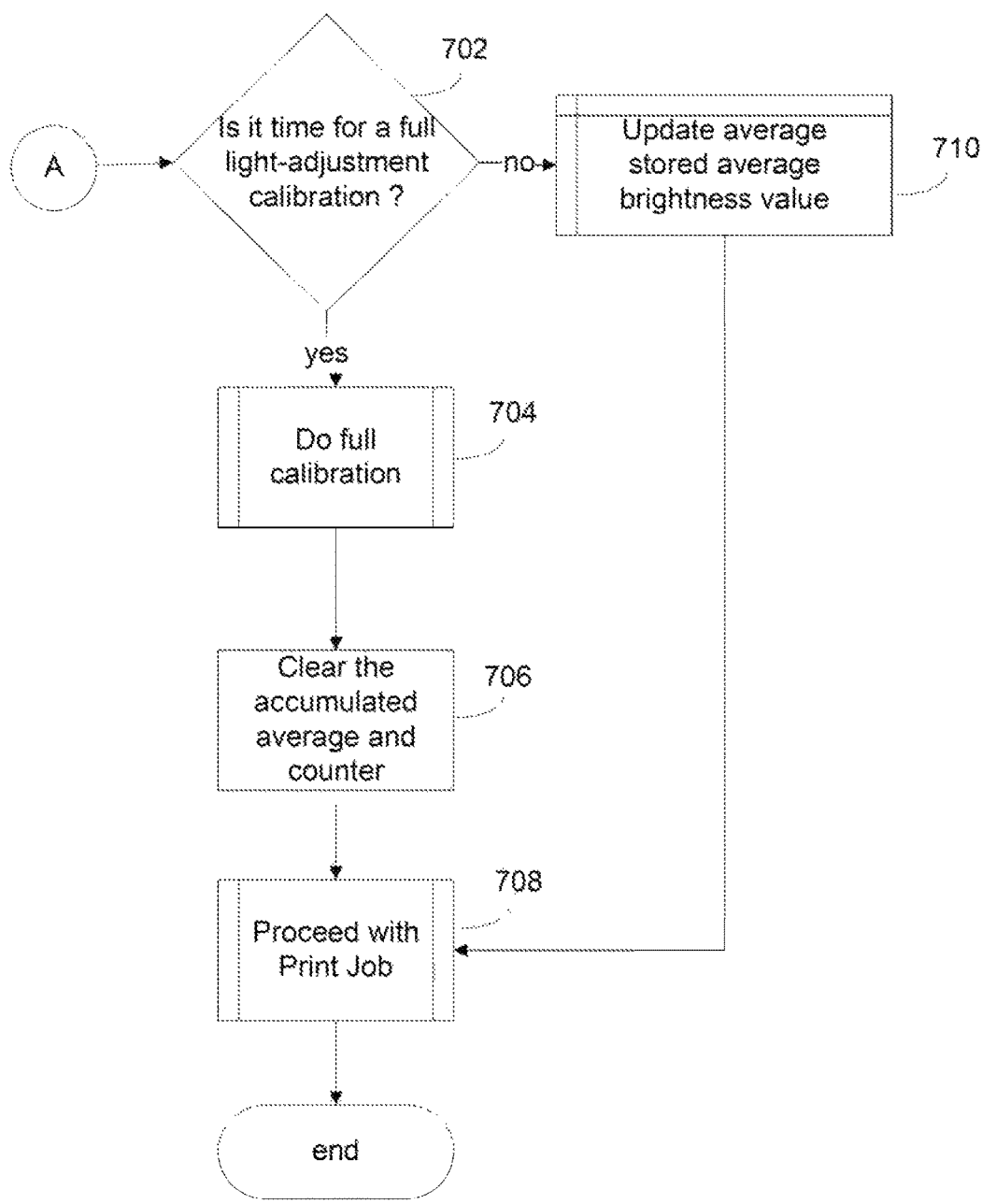
Figure 8:
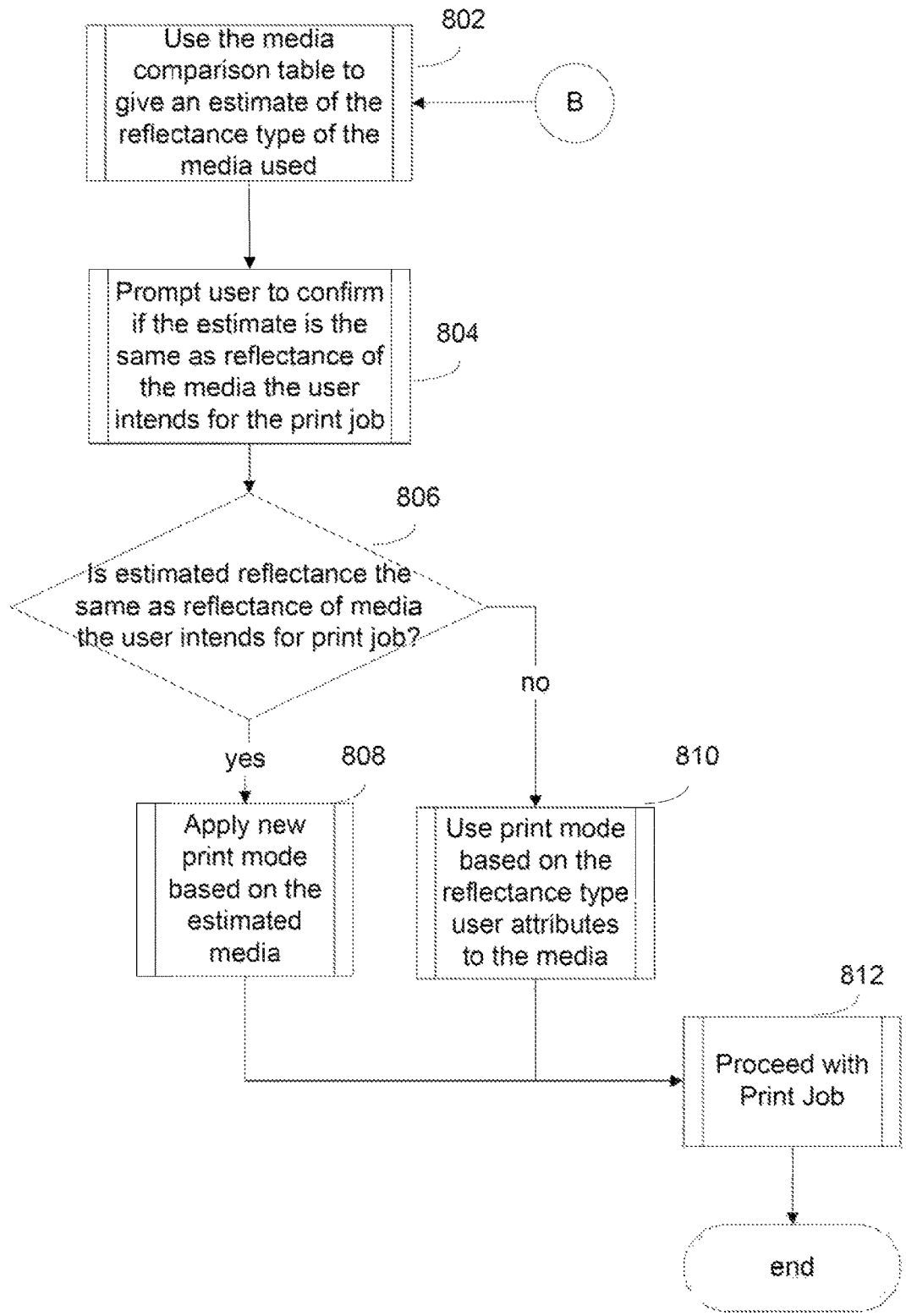

FIGS. 6-8 present a flow diagram of operation in a system according to various embodiments. In discussing FIGS. 6-8, reference may be made to the diagrams of FIGS. 1 and 4 to provide contextual examples. Implementation, however, is not limited to those examples. Starting with FIG. 6, a stated reflectance identifier for a media to be printed on during fulfillment of a print job is received (block 602). Referring back to FIGS. 1 and 4, stated reflectance module 130 or 430 may be responsible for implementing block 602.

Continuing with FIG. 6, it is determined whether the print job is a draft mode print job (604). If the print job is a draft mode print job, the job is printed without a quick media calibration (606). If the print job is not a draft mode print job a measurement of brightness is taken utilizing an optical sensor and an illuminator. The measurement is a measurement of light from the illuminator reflected off the media (608). Referring back to FIGS. 1 and 4, measurement module 132 or 432 may be responsible for implementing blocks 604, 606, and 608.

Continuing with FIG. 6 and FIG. 7 the measurement is compared to a stored average brightness value for medias identified with a reflectance type that is the same as the stated reflectance identifier (block 610). If the measurement is within a range of the average value (block 610), it is next determined whether it is time for whether it is time to perform an illuminator-adjustment calibration (block 702). If it is time to perform an illuminator-adjustment calibration, the illuminator-adjustment calibration is conducted (704), the average stored average brightness value is cleared (706), and printing of the print job proceeds (708) after the full calibration. Referring back to FIGS. 1 and 4, comparison module 134 or 434 may be responsible for implementing blocks 610, 702, 704, 706, and 708.

If it is not time to perform a full illuminator-adjustment calibration (702), the average stored average brightness value is adjusted to include the brightness measurement (710) and printing on the media proceeds (708). Referring back to FIGS. 1 and 4, adjustment module 136 or 436 may be responsible for implementing block 710.

Continuing with FIG. 6 and moving to FIG. 8, If the brightness measurement is outside the range of the average value (block 610), the brightness measurement is compared to a database that associates brightness measurements and reflectance identifiers to determine an estimated reflectance identifier for the media (802). The estimated identifier is sent to a user and the user is prompted to reconcile disparity between the stated identifier and the estimated identifier by confirming whether the media estimated reflectance identifier is the same as the reflectance type for the media the use intends for the print job (804 and 806). If a user communication is received stating that the media loaded in the printer is the same type as the type the user intended for the print job, a new print mode is applied to the print job based on the estimated reflectance type (808). If a user communication is received stating that the media loaded in the printer not is the same type as the type the user intended for the print job, a print mode is applied to the print job based on the reflectance type the user attributes to the media (810). After such determination of print mode, the print job is printed (812). Referring back to FIGS. 1 and 4, estimated reflectance module 138 or 438 may be responsible for implementing blocks 802. 804, 806, 808, 810, and 812.

Various modifications may be made to the disclosed embodiments and implementations without departing from their scope. Therefore, the illustrations and examples herein should be construed in an illustrative, and not a restrictive, sense.

What is claimed is:

1. A non-transitory computer-readable storage medium containing instructions, the instructions when executed by a processor to cause the processor to:
   receive a stated reflectance identifier for a media to be printed on during fulfillment of a print job;
   utilizing an optical sensor and an illuminator, take a measurement of brightness of light from the illuminator reflected off the media;
   compare the measurement to a brightness values database that comprises a stored average brightness value for medias identified with a same reflectance type as the stated identifier;
   responsive to determining the measurement is within a range of the average value, adjust the average value to include the measurement and, cause printing on the media according to the job;
   responsive to determining the measurement is outside the range,
     compare the measurement to a media identifier database associating brightness measurements and reflectance identifiers to determine an estimated reflectance identifier for the media,
     send the estimated identifier to a user and prompt the user to perform a correction event reconciling disparity between the stated identifier and the estimated identifier, and
     cause printing on the media according to the job.

2. The medium of claim 1, wherein the comparison is performed responsive to determining that it is not time to perform an illuminator-adjustment calibration.

3. The medium of claim 1, wherein the instructions cause the processor to, responsive to determining that it is time to perform a light adjustment calibration, clear the average stored average brightness value, and proceed with the illuminator-adjustment calibration prior to fulfilling the print job.

4. The medium of claim 1, wherein the average value is calculated utilizing a plurality of brightness measurements of light reflected off other medias of a same reflectance type as the stated identifier.

5. The medium of claim 1, wherein the media is situated in a printable position during the taking of the measurement, and the other medias were situated in the position during taking of the plurality of brightness measurements.

6. The medium of claim 1, wherein the correction event includes confirming whether the media is of a same reflectance type as the user intended for the print job.

7. The medium of claim 6, wherein the instructions cause the processor to, responsive to the confirmation, apply a print mode based on the estimated identifier.

8. The medium of claim 6, wherein the instructions cause the processor to responsive to a user communication that the media loaded in the printer is not a same type as the user intended for the print job, apply a print mode based on the reflectance type that the user attributes to the media.

9. The medium of claim 1, wherein the taking of the measurement occurs responsive to determining that the print job is not a draft mode print job.

10. The medium of claim 1, wherein the sensor is a single channel sensor.

11. The medium of claim 1, wherein the illuminator includes a light emitting diode.

12. The medium of claim 1, in which the brightness values database comprises a running counter of the number of measurements to be averaged.

13. A system, comprising:
a stated reflectance module, configured to receive a stated reflectance identifier for a media to be printed on during fulfillment of a print job;
a measurement module, configured to, utilizing an optical sensor and an illuminator, take a measurement of brightness of light from the illuminator reflected off the media;
a comparison module, configured to compare the measurement to a brightness values database that comprises a stored average brightness value for medias identified with the stated identifier;
an adjustment module, configured to, responsive to determining the measurement is within a range of the average value, adjust the average value to include the measurement and proceed with printing on the media;
an estimated reflectance module, configured to, responsive to determining the measurement is outside the range,
    compare the measurement to a media identifier database associating brightness measurements and reflectance identifiers to determine an estimated reflectance identifier for the media,
    send the estimated identifier to a user and prompt the user to perform a correction event reconciling disparity between the stated identifier and the estimated identifier, and
    proceed with printing after the user performs the correction event.

14. The system of claim 13, wherein the comparison is performed responsive to determining that it is not time to perform an illuminator-adjustment calibration.

15. The system of claim 13, wherein the instructions cause the processor to, responsive to determining that it is time to perform a illuminator-adjustment calibration, clear the average stored average brightness value and conduct the illuminator-adjustment calibration prior to fulfilling the print job.

16. The system of claim 13, wherein the media is situated in a printable position during the taking of the measurement, and other medias were situated in the position during taking of a plurality of brightness measurements.

17. The system of claim 13, wherein the correction event includes confirming that media loaded in the printer is of a same reflectance type as the expected identifier.

18. The system of claim 17, wherein the instructions cause the processor to, responsive to the user confirming the media loaded in the printer is a same type as the user intended for the print job, apply a print mode based on the estimated identifier.

19. The system of claim 17, wherein the instructions cause the processor to responsive to the user communicating that the media loaded in the printer is not a same type as the user intended for the print job, apply a print mode based on a media reflectance type that the user indicates is loaded in a printable position.

20. A non-transitory computer-readable storage medium containing instructions, the instructions when executed by a processor to cause the processor to:
receive a stated reflectance identifier for a media to be printed on during fulfillment of a print job;
utilizing an optical sensor and an LED, take a measurement of brightness of light from the LED reflected off the media while the media is situated in a printable position;
responsive to determining that it is not time to perform a illuminator-adjustment calibration, compare the measurement to a brightness values database that comprises a stored average brightness value for medias identified with the stated identifier,
wherein the average value is calculated utilizing a plurality of brightness measurements of light reflected off other medias in the position with a same reflectance type as the stated identifier;
responsive to determining the measurement is within a range of the average value, adjust the average value to include the measurement, wherein the range comprises a range of values greater than and less than the average value;
responsive to determining the measurement is outside the range,
    compare the measurement to a media identifier database associating brightness measurements and reflectance identifiers to determine an estimated reflectance identifier for the media,
    send the estimated identifier to a user and prompt the user to confirm whether the media is of a same reflectance type as the expected identifier;
    responsive to receipt of a user communication confirming the media loaded in a printable position is a same type as the user intended for the print job, apply a print mode based on the estimated identifier;

responsive to receipt of a user communication that the media loaded in the printer is not a same type as the user intended for the print job, apply a print mode based on the reflectance type that the user attributes to the media;
print on the media according to the job.

\* \* \* \* \*

UNITED STATES PATENT AND TRADEMARK OFFICE
CERTIFICATE OF CORRECTION

PATENT NO. : 9,992,354 B2
APPLICATION NO. : 13/363227
DATED : June 5, 2018
INVENTOR(S) : Tong Nam Samuel Low et al.

It is certified that error appears in the above-identified patent and that said Letters Patent is hereby corrected as shown below:

In the Claims

In Column 12, Line 6 approx., Claim 15, delete "a" and insert -- an --, therefor.

Signed and Sealed this
Twenty-fourth Day of December, 2019

Andrei Iancu
*Director of the United States Patent and Trademark Office*